US 11,771,536 B2

United States Patent
Hoyer et al.

(10) Patent No.: US 11,771,536 B2
(45) Date of Patent: Oct. 3, 2023

(54) METHOD FOR PRODUCING A DENTAL WORKING MODEL

(71) Applicant: Institut Straumann AG, Basel (CH)

(72) Inventors: Maximilian Hoyer, Zorneding (DE); Andreas Kunert, Oberostendorf (DE); Sergej Harsch, Feldafing (DE)

(73) Assignee: INSTITUT STRAUMANN AG, Basel (CH)

( * ) Notice: Subject to any disclaimer, the term of this patent is extended or adjusted under 35 U.S.C. 154(b) by 0 days.

(21) Appl. No.: 17/221,123

(22) Filed: Apr. 2, 2021

(65) Prior Publication Data

US 2021/0307885 A1   Oct. 7, 2021

(30) Foreign Application Priority Data

Apr. 6, 2020 (EP) .................................. 20168149

(51) Int. Cl.
 *A61C 13/34* (2006.01)
 *A61C 11/08* (2006.01)
 *A61C 13/00* (2006.01)

(52) U.S. Cl.
 CPC .............. *A61C 13/34* (2013.01); *A61C 11/08* (2013.01); *A61C 13/0019* (2013.01)

(58) Field of Classification Search
 CPC . A61C 13/34; A61C 13/0019; A61C 13/0027; A61C 11/08; A61C 11/081; A61C 11/082; A61C 11/084; A61C 11/085; A61C 11/087; A61C 11/088
 See application file for complete search history.

(56) References Cited

U.S. PATENT DOCUMENTS 1,736,006 A * 11/1929 Hagman .............. A61C 11/084
                                                                433/64
2,365,475 A * 12/1944 Klein ..................... A61C 11/08
                                                                433/60
(Continued)

FOREIGN PATENT DOCUMENTS

DE    20 2011 101103    7/2011
DE    10 2017 002617    3/2018
(Continued)

OTHER PUBLICATIONS

Extended European Search Report (w/ English translation) for corresponding European Application No. 20168149.1, dated Sep. 3, 2020, 12 pages.

*Primary Examiner* — Heidi M Eide
*Assistant Examiner* — Lina Faraj
(74) *Attorney, Agent, or Firm* — Dority & Manning, P.A.

(57) ABSTRACT

The invention relates to an additive method for producing a dental working model for an articulator, comprising the steps: additively producing a base plate for attachment to the articulator, and additively producing a dental model, wherein the base plate and the dental model are configured to be fixed to one another in a positionally secure manner. Another object of the invention is an additively produced dental working model for an articulator, comprising an additively produced base plate configured for attachment to the articulator, and an additively produced dental model, wherein the base plate and the dental model are configured to be fixed to one another in a positionally secure manner.

15 Claims, 4 Drawing Sheets

(56) References Cited

U.S. PATENT DOCUMENTS

| | | | | |
|---|---|---|---|---|
| 3,092,909 A * | 6/1963 | Miller | A61C 11/02 | 433/60 |
| 4,382,787 A * | 5/1983 | Huffman | A61C 11/084 | 433/64 |
| 4,470,815 A * | 9/1984 | Hazar | A61C 13/00 | 433/213 |
| 4,538,987 A * | 9/1985 | Weissman | A61C 9/002 | 433/34 |
| 4,708,835 A * | 11/1987 | Kiefer | A61C 9/002 | 264/17 |
| 5,018,972 A * | 5/1991 | Schreinemakers | A61C 19/04 | 433/213 |
| 5,459,995 A * | 10/1995 | Norton | F01D 25/246 | 60/753 |
| 2003/0180682 A1* | 9/2003 | Davidov | A61C 11/08 | 433/213 |
| 2006/0127838 A1 | 6/2006 | Liu et al. | | |
| 2007/0190492 A1* | 8/2007 | Schmitt | A61C 13/0004 | 433/213 |
| 2007/0212663 A1* | 9/2007 | Oestreich | A61C 11/00 | 433/213 |
| 2013/0041630 A1* | 2/2013 | Gilles | A61C 5/77 | 703/1 |
| 2014/0220504 A1* | 8/2014 | Kim | A61C 11/08 | 433/57 |
| 2014/0242539 A1* | 8/2014 | Fisker | A61C 11/08 | 700/98 |
| 2014/0295371 A1* | 10/2014 | Huffman | A61C 11/00 | 700/98 |
| 2014/0342306 A1* | 11/2014 | Lerner | A61C 11/08 | 433/54 |
| 2014/0356806 A1* | 12/2014 | Liebman | A61C 11/088 | 433/37 |
| 2015/0111168 A1* | 4/2015 | Vogel | A61C 11/02 | 433/196 |
| 2016/0089222 A1* | 3/2016 | Geier | A61C 13/34 | 433/213 |
| 2016/0220336 A1* | 8/2016 | Byun | A61C 11/02 | |
| 2017/0189142 A1* | 7/2017 | Wagner | B33Y 10/00 | |
| 2017/0224449 A1* | 8/2017 | Gallacher | A61C 11/02 | |
| 2018/0110603 A1* | 4/2018 | Stipek, Sr | A61C 9/0046 | |
| 2020/0100878 A1* | 4/2020 | Spanke | A61C 11/087 | |

FOREIGN PATENT DOCUMENTS

| | | |
|---|---|---|
| DE | 20 2019 101389 | 3/2019 |
| FR | 2590157 A1 * | 5/1987 |
| WO | WO 85/00283 | 1/1985 |

* cited by examiner

METHOD FOR PRODUCING A DENTAL WORKING MODEL

CROSS-REFERENCE TO RELATED APPLICATIONS

This application is based upon and claims the right of priority to European Patent Application No. 20168149.1 filed on Apr. 6, 2020, the disclosure of which is hereby incorporated by reference herein in its entirety for all purposes.

TECHNICAL FIELD

The invention relates to an additive method for producing a dental working model for an articulator comprising the step of additively producing a dental model. The invention further relates to an additively produced dental working model for an articulator comprising an additively produced dental model.

BACKGROUND OF THE INVENTION

In the dental model, i.e. in particular in the direction of the oral cavity, a guide and/or an elevation of the otherwise preferably essentially flat base plate is provided, between which and the dental model a splint can be inserted. The guide and/or the elevation preferably extends along the oral and/or dorsal side of the base plate. According to another preferred embodiment it is provided that the splint can be inserted at a distal end of the dental model from buccal in the palantinal, lingual and/or medial direction, in particular between the guide and/or the elevation and the dental model. Immediately in front of the guide, a groove can be provided in the base plate, which extends along the guide and into which the splint can be inserted and thus can be guided along the guide. The groove preferably extends from a longitudinal side in the palantinal, lingual and/or medial direction to just before the other longitudinal side of the base plate.

According to a preferred embodiment, the base plate comprises an upper base plate and a lower base plate and/or the dental model comprises an upper dental model and a lower dental model. The upper dental model preferably corresponds to a positive model of an upper jaw with teeth and gums of a patient, while the lower dental model preferably corresponds to a positive model of a lower jaw with teeth and gums of the patient. The upper base plate and the lower base plate are preferably formed identical for the purpose of simpler manufacture and can preferably be reused. A splint is preferably respectively associated to the upper dental model and the lower dental model.

According to a preferred embodiment, the base plate and the dental model respectively comprise at a vestibular end corresponding fixing elements that are in particular aligned parallel to one another and by means of which the base plate and the dental model can be fixed to one another in a positionally secure manner. According to another preferred embodiment, the fixing elements are configured as latching elements and/or bevels. In the case of additive production, the fixing elements are preferably introduced into the base plate and the dental model, so that no further work step is necessary. More preferably, the fixing elements already allow the base plate and dental model to be fixed to one another in a positionally secure manner without the need for the splint. The splint preferably clamps the dental model on the one hand against the guide and/or the elevation and on the other hand against the fixing elements.

According to a preferred embodiment, a bottom side of the dental model facing the base plate is at least partially open so that stumps and/or implant analogs of the dental model can be pressed out of the dental model in the occlusal direction. In this way, different stumps and/or implant analogs can be attached, tested or exchanged at the dental model in a simple manner. In the prior art, a dental model is often sawn from plaster in order to be able to remove stumps or individual teeth on the dental model. In the proposed solution of the 3D-printed dental model, however, sawing is unsuitable.

According to another preferred embodiment of the method, the base plate and the dental model are configured magnet-free. In this way, the proposed solution can be produced particularly easily in a single work step, namely solely by means of 3D printing, without the need for further parts for fixing the base plate and the dental model to one another in a positionally secure manner. At the same time, the manufacturing costs are reduced compared to the prior art, since no magnets or other parts are required for a positionally secure fixation.

The object is also achieved by an additively produced dental working model for an articulator, comprising:
an additively produced base plate which is configured for attachment to the articulator, and
an additively produced dental model,
wherein the base plate and the dental model are configured to be fixable to one another in a positionally secure manner.

In the proposed working model, the base plate and the dental model can be fixed to one another in a simple and positionally secure manner, without the need for a magnet or comparable means known from the prior art or other purchased parts. Since the base plate and the dental model are produced additively, there is also no need to saw a plaster dental model, which is otherwise known from the prior art, in order to remove stumps or individual teeth. In particular, by means of a splint described below, the fixing and releasing can be accomplished in a particularly simple manner.

According to a preferred embodiment, the additively produced dental working model comprises an additively produced splint which is configured to affect the positionally secure fixation by being inserted between the base plate and the dental model.

According to a preferred embodiment of the additively produced dental working model, the base plate and the dental model at a vestibular end respectively comprise corresponding fixing elements which are in particular aligned parallel to one another and which are configured to fix the base plate and the dental model to one another in a positionally secure manner. According to a preferred embodiment, the fixing elements are configured as latching elements and/or bevels.

According to a preferred embodiment of the additively produced dental working model, a bottom side of the dental model facing the base plate is at least partially open so that stumps and/or implant analogs of the dental model can be pressed out of the dental model in the occlusal direction. According to a preferred embodiment, the base plate and the dental model are configured magnet-free.

Further embodiments and advantages of the working model are obvious to the person skilled in the art from the method described above.

BRIEF DESCRIPTION OF THE DRAWINGS

The invention is explained in more detail below with reference to the attached drawings based on preferred exemplary embodiments; in the drawings.

DETAILED DESCRIPTION OF EXEMPLARY EMBODIMENTS

Figure 1:
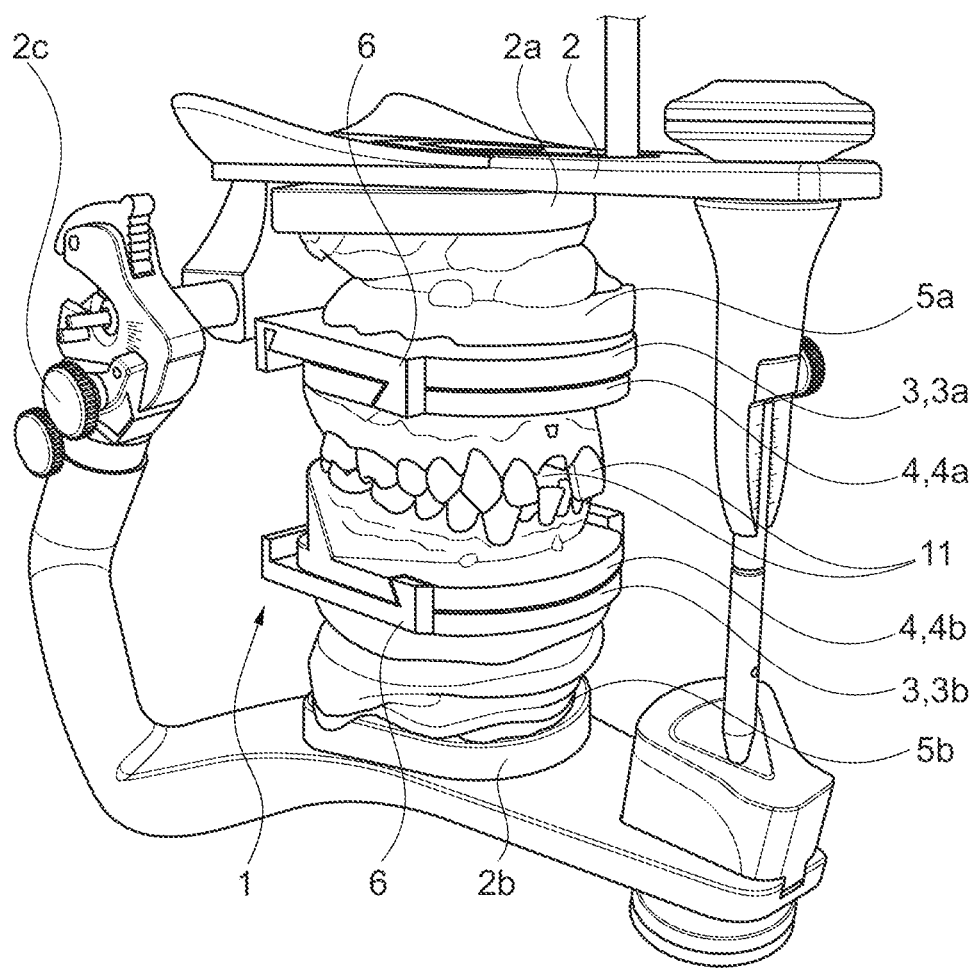
FIG. 1 shows an additively produced dental working model according to a preferred embodiment of the invention in a schematic perspective view.

FIG. 1 shows an additively produced dental working model 1 according to a preferred exemplary embodiment of the invention in a schematic perspective view, which is mounted in an articulator 2 in an assembled state. The dental working model 1 comprises, as can be seen in particular from the perspective plan view of a part of the unassembled dental working model 1 from FIG. 2, an additively produced base plate 3 and an additively produced dental model 4.

Returning to FIG. 1, the base plate 3 comprises an upper base plate 3a and a lower base plate 3b, and the dental model 4 comprises an upper dental model 4a and a lower dental model 4b. The upper base plate 3a is rigidly and permanently attached to an upper articulator plate 2a of the articulator 2 by means of an upper plaster base 5a. In an analogous manner, the lower base plate 3b is rigidly and permanently attached to a lower articulator plate 2b of the articulator 2 by means of a lower plaster base 5b. Instead of a plaster base 5a, 5b, other means of attachment can be used, too.

The upper articulator plate 2a and the lower articulator plate 2b are connected to one another via a hinge 2c of the articulator 2. Since the base plate 3 and the dental model 4 can be fixed to one another in a positionally secure manner, the chewing movements of a patient can be imitated. Inasfar it is spoken of the base plate 3 and a dental model 4, the upper base plate 3a and the upper dental model 4a as well as the lower base plate 3b and the lower dental model 4b are also included.

As stated above, the base plate 3 and the dental model 4 are produced additively, which means that a printer material, in particular a polymer material, is applied layer by layer, also called printing, in order to obtain the base plate 3 and the dental model 4. The layer-by-layer buildup is implemented computer-controlled, in particular by means of a DLP, digital light processing, method, wherein a particularly liquid monomer is used as the printer material, which cures or polymerizes under the influence of UV light. For example, SHERAprint model plus UV grey/sand or P pro Master model grey/dark beige can be used as printer material and/or polymer material, or alternatively the commercially available materials Accura 60, Accura ClearVue and RenShape 7870 can be used. Other polymers that are particularly transparent and are referred to as biocompatible are, for example, FullCure 630 and FullCure 810 or WaterShed 11122, ProtoGen 18420 and BioClear. Initially, the dentition of a patient is scanned, for example by use of an intraoral scanner, in order to additively produce the dental model 4 from the CAD raw data obtained. The dental model 4 thus corresponds to a three-dimensional positive model of the patient's teeth and gum.

For the positionally secure fixation of the base plate 3 and the dental model 4 to one another, the base plate 3 and the dental model 4 respectively comprise at a vestibular end thereof corresponding fixing elements 6 aligned parallel to one another. The base plate 3 comprises an essentially flat, rectangular extension, wherein the vestibular side of the rectangle is extended with a segment of a circular arc.

Figure 2:
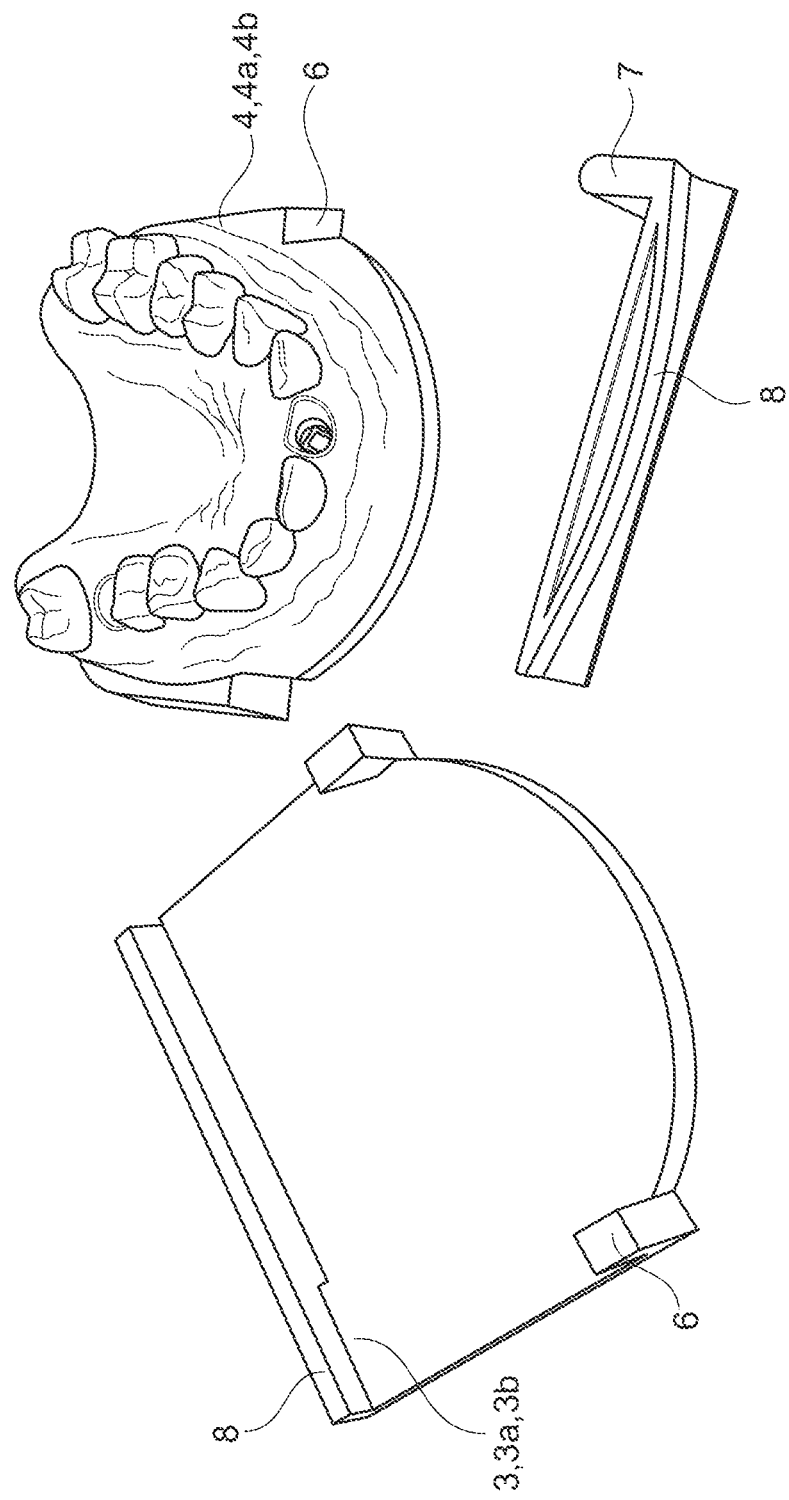
FIG. 2 shows the unassembled dental working model according to FIG. 1 comprising a base plate and a dental model in a schematic perspective plan view.

As can be seen in particular from FIG. 2, the fixing elements 6 are arranged at the vestibular end of the base plate 3 at corner-like areas between the circular arc segment and a buccal side of the rectangular extension oppositely and spaced apart from each other. The fixing elements 6 are configured as bevels tapering towards the flat, rectangular extension in the vestibular direction, into which the corresponding fixing elements 6 provided at the dental model 4 and likewise configured as bevels can be inserted, so that the respective fixing elements 6 come to rest in a form-fitting manner on each other and the dental model 4 comes to rest on the base plate 3.

Even if the base plate 3 and the dental model 4 can basically be fixed to one another in a positionally secure manner by the fixing elements 6, a splint 7 is advantageously provided, which, like the base plate 3 and the dental model 4, is produced additively. The splint 7 is configured in the form of a rail 7 with a spring element 8 for producing a force-fitting and/or form-fitting fixation between the base plate 3 and the dental model 4, as can be seen in detail from FIG. 2 or FIG. 3.

For fixing, the splint 7 is inserted at a distal end of the dental model 3 from buccal in the palantinal and/or medial direction between the base plate 3 and the dental model 4, i.e. in a direction parallel to the oral and/or dorsal side of the rectangular base plate 3. The oral and/or dorsal side of the base plate 3 is provided with a cuboid guide 9 projecting beyond the base plate 3 at the oral and/or dorsal side and extending along the side, whereby the base plate 3 is approximately L-shaped in a buccal side view, which is only interrupted at the vestibular end by the fixing elements 6.

Figure 3:
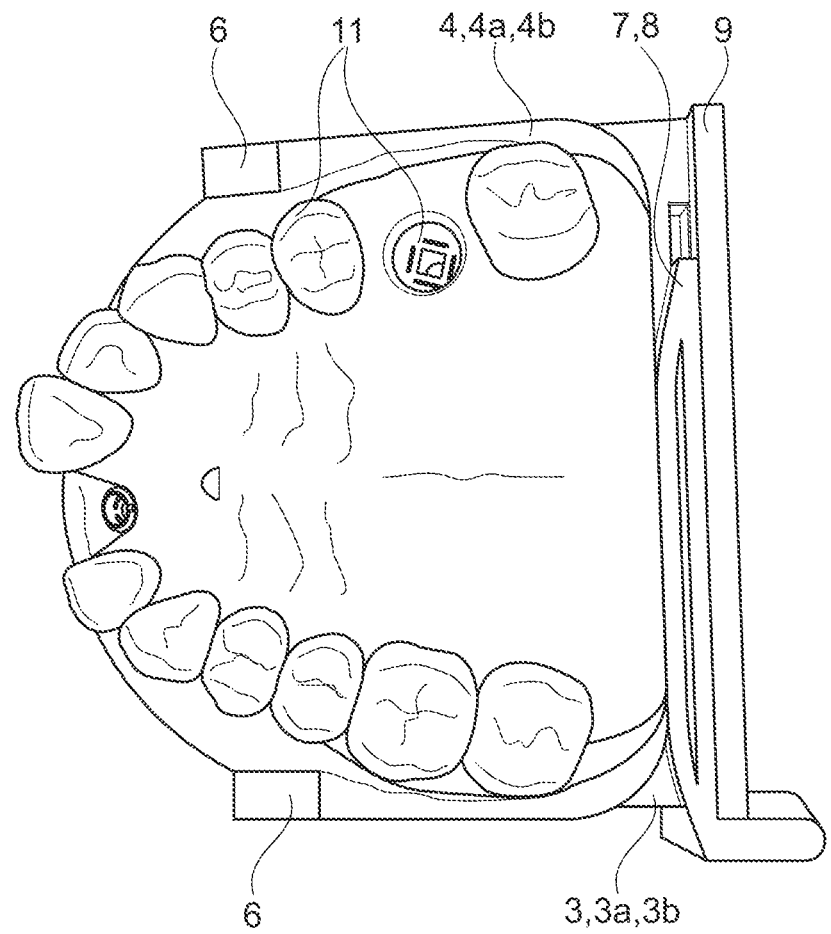
FIG. 3 shows a dental model according to FIG. 2 placed on a base plate in a schematic plan view.

FIG. 3 shows a plan view of the dental model 4 placed on the base plate 3, wherein the fixing elements 6 interlock at the vestibular end. At the oral and/or dorsal end, the splint pin 7 is inserted between the base plate 3 and the dental model 4. The spring element 8 exerts a force caused by the spring onto the dental model 4, while the splint is supported at the guide 9 at the end opposite the spring element 8, so that the fixing elements 6 are pressed against one another. As a result, the base plate 3 and the dental model 4 are fixed to one another in a positionally secure manner, although both the base plate 3 and the dental model 4 are implemented magnet-free, i.e. without magnets.

Figure 4:
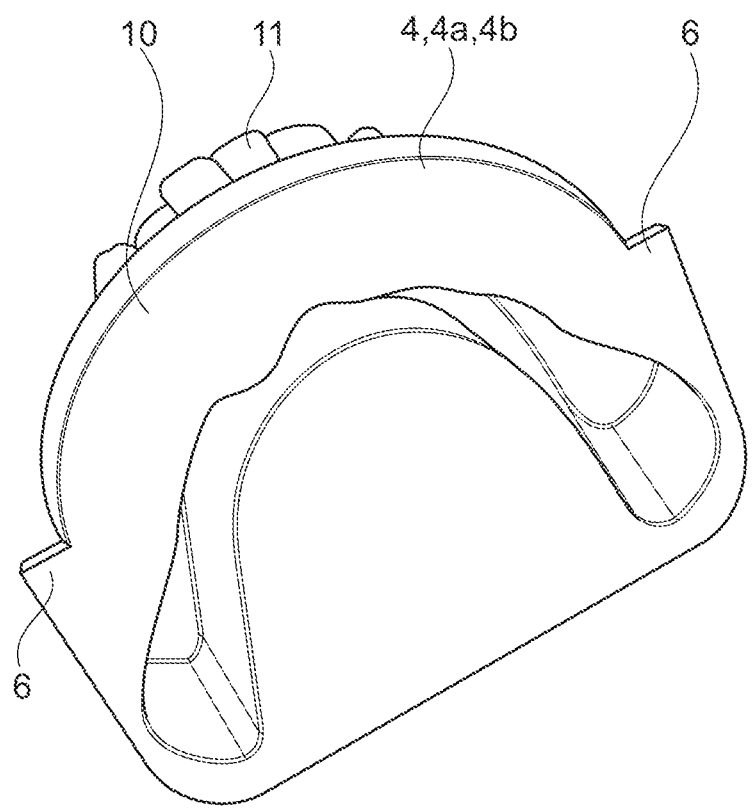
FIG. 4 shows a perspective schematic bottom view of the dental model according to FIG. 3.

Finally, FIG. 4 shows a perspective bottom view of the dental model 4, the bottom side 10 of which, facing the base plate 3, is at least partially open. As a result, stumps and/or implant analogs 11 of the dental model 4 can be pushed out of the dental model 4 in the occlusal direction, as indicated in the plan view in FIG. 3, and replaced for other stumps and/or implant analogs 11.

The exemplary embodiments described are merely examples that can be modified and/or supplemented in many ways within the scope of the claims. Each feature that has been described for a specific exemplary embodiment can be used independently or in combination with other features in any other exemplary embodiment. Each feature that has been described for an exemplary embodiment of a specific category can also be used in a corresponding manner in an exemplary embodiment of another category.

LIST OF REFERENCE SYMBOLS

Working model 1
Articulator 2

Upper articulator plate 2*a*
Lower articulator plate 2*b*
Hinge 2*c*
Base plate 3
Upper base plate 3*a*
Lower base plate 3*b*
Dental model 4
Upper dental model 4*a*
Lower dental model 4*b*
Upper plaster base 5*a*
Lower plaster base 5*b*
Fixing element 6
Splint, rail 7
Spring element 8
Guide 9
Bottom side 10
Stumps, implant analogs 11

The invention claimed is:

1. An additive method for producing a dental working model for an articulator, comprising:
    additively producing a base plate for fastening to the articulator;
    additively producing a dental model;
    additively producing a splint comprising a spring element; and
    inserting the splint between the base plate and a dorsal side of the dental model, by insertion from a buccal side in at least one of a palatal direction of the dental model or a medial direction of the dental model, to exert a force through the spring member to positionally secure the fixation of the base plate and the dental model to one another.

2. The additive method according to claim 1, wherein the splint is configured in a form of at least one of a wedge or a rail, with the spring element for producing at least one of a force- or form-fitting fixation.

3. The additive method according to claim 1, wherein the base plate comprises an upper base plate and a lower base plate.

4. The additive method according to claim 1, wherein the base plate and the dental model respectively comprise at a vestibular end corresponding fixing elements, by means of which the base plate and the dental model can be fixed to one another in a positionally secure manner.

5. The additive method according to claim 4, wherein the fixing elements are configured as at least one of latching elements or as bevels.

6. The additive method according to claim 5, wherein the fixing elements are aligned parallel to one another.

7. The additive method according to claim 1, wherein a bottom side of the dental model facing the base plate is at least partially open, so that at least one of stumps or implant analogs of the dental model can be pressed out of the dental model in an occlusal direction.

8. The additive method according to claim 1, wherein the base plate and the dental model are configured to be coupled to each other magnet-free.

9. The additive method according to claim 1, wherein the dental model comprises an upper dental model and a lower dental model.

10. An additively manufactured dental working model for an articulator, comprising:
    an additively produced base plate configured for attachment to the articulator;
    an additively produced dental model; and
    an additively produced splint comprising a spring element,
    wherein the splint is configured for insertion between the base plate and a dorsal side of the dental model, by insertion from a buccal side in at least one of a palatal direction of the dental model or a medial direction of the dental model, to exert a force through the spring member to positionally secure the fixation of the base plate and the dental model to one another.

11. The additively manufactured dental working model according to claim 10, wherein the base plate and the dental model at a vestibular end respectively comprise corresponding fixing elements to fix the base plate and the dental model to one another in a positionally secure manner.

12. The additively manufactured dental working model according to claim 11, wherein the fixing elements are configured as at least one of latching elements or bevels.

13. The additively manufactured dental working model according to claim 11, wherein the fixing elements are aligned parallel to one another.

14. The additively manufactured dental working model according to claim 10, wherein a bottom side of the dental model facing the base plate is at least partially open, so that at least one of stumps or implant analogs of the dental model can be pressed out of the dental model in an occlusal direction.

15. The additively manufactured dental working model according to claim 10, wherein the base plate and the dental model are configured to be coupled to each other magnet-free.

* * * * *